United States Patent [19]
Altman et al.

[11] 4,168,126
[45] Sep. 18, 1979

[54] ELECTRO-OPTICAL MEASURING SYSTEM USING PRECISION LIGHT TRANSLATOR

[75] Inventors: Norman G. Altman, Stamford, Conn.; J. Rodney Worden, New York, N.Y.

[73] Assignee: Altman Associates, Inc., Stamford, Conn.

[21] Appl. No.: 812,774

[22] Filed: Jul. 5, 1977

[51] Int. Cl.² .................... G01B 11/10; G02B 27/17
[52] U.S. Cl. ................... 356/386; 350/6.4; 350/6.5; 350/6.1
[58] Field of Search .......... 350/6.2, 6.4, 6.5, 6.7, 350/6.8, 285; 356/160, 167, 386, 387; 358/205, 206

[56] References Cited
U.S. PATENT DOCUMENTS

| | | | |
|---|---|---|---|
| 3,647,956 | 3/1972 | Buck et al. ............... | 350/6.8 |
| 3,905,705 | 9/1975 | Petrohilos ................ | 356/160 |
| 3,909,105 | 9/1975 | Neiswander et al. ...... | 350/285 |

*Primary Examiner*—John K. Corbin
*Attorney, Agent, or Firm*—Michael Ebert

[57] ABSTRACT

An electro-optical measuring system wherein a scanning laser or light beam is precisely translated in a direction parallel to itself at a constant rate to define a time-varying sensing field whose energy is picked up by a photoelectric detector that yields an output signal. An object whose dimension is to be measured is inserted in the field whereby the output signal of the detector takes the form of a pulse whose leading edge is developed by the traversal of the beam across one boundary of the object, thereby blocking passage of the energy to the detector, and whose trailing edge is developed by the traversal of the beam across the opposite boundary of the object to restore the energy pick-up. The width or time duration of the pulse is an exact index to the distance between these boundaries, the time duration being converted into a measurement reading. Scanning of the beam is effected by combining two or more optical scanner means whose individual non-linearities are of such magnitude and form that in combination these non-linearities are effectively cancelled out and a final scan is achieved that is extremely linear, whereby measurements of exceptional accuracy are obtained.

11 Claims, 10 Drawing Figures

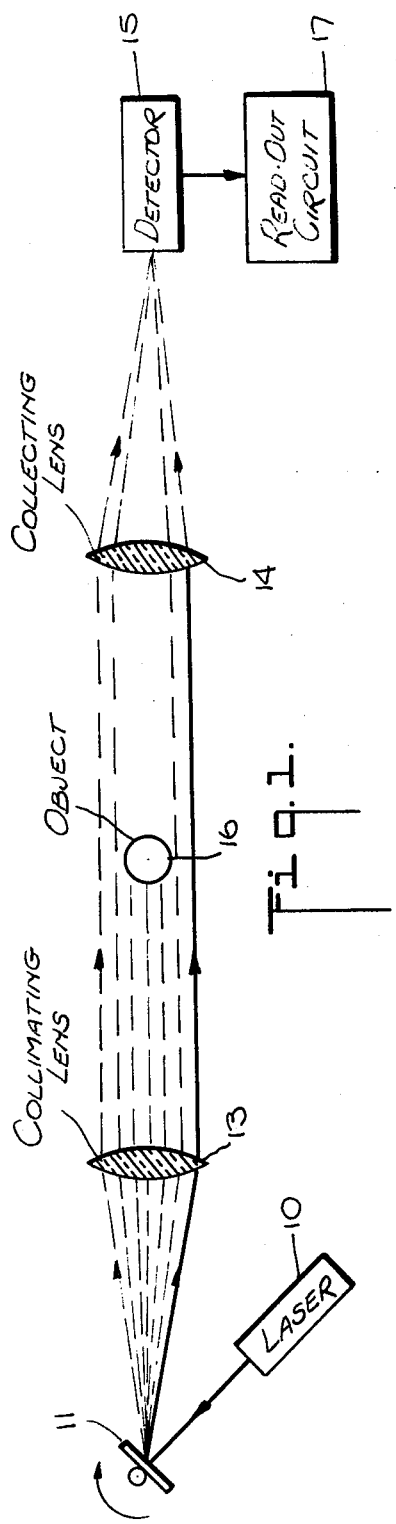
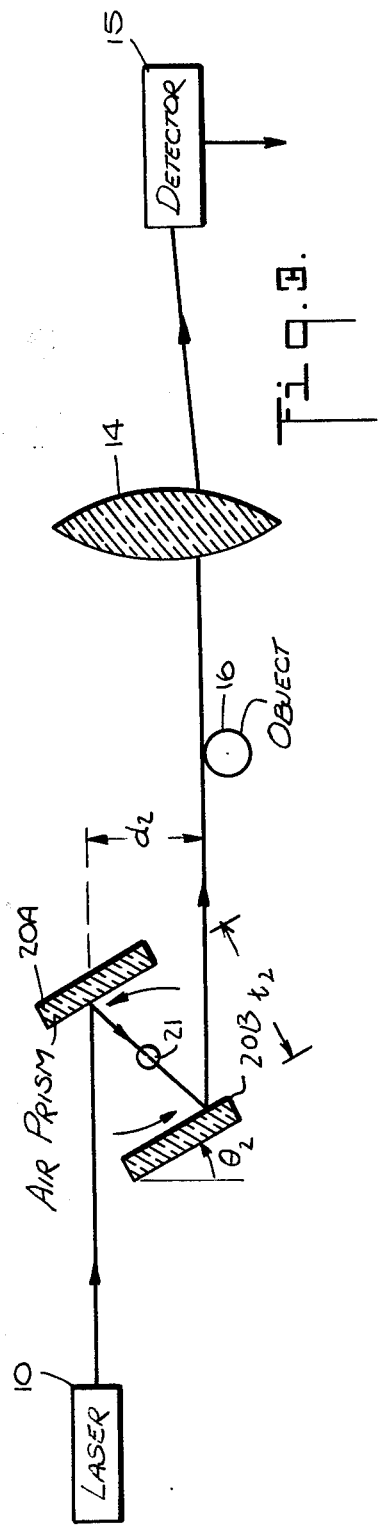
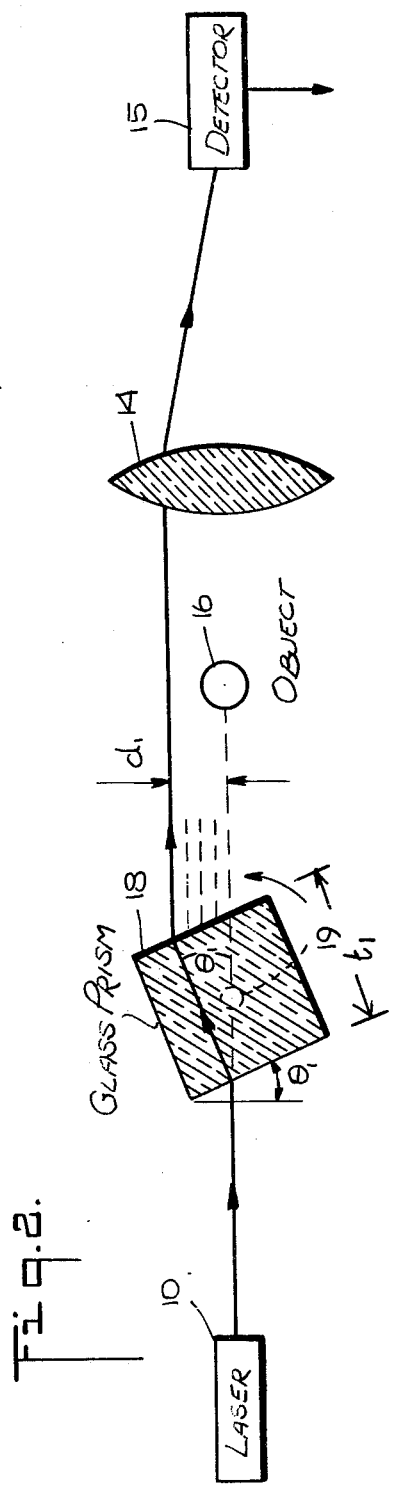

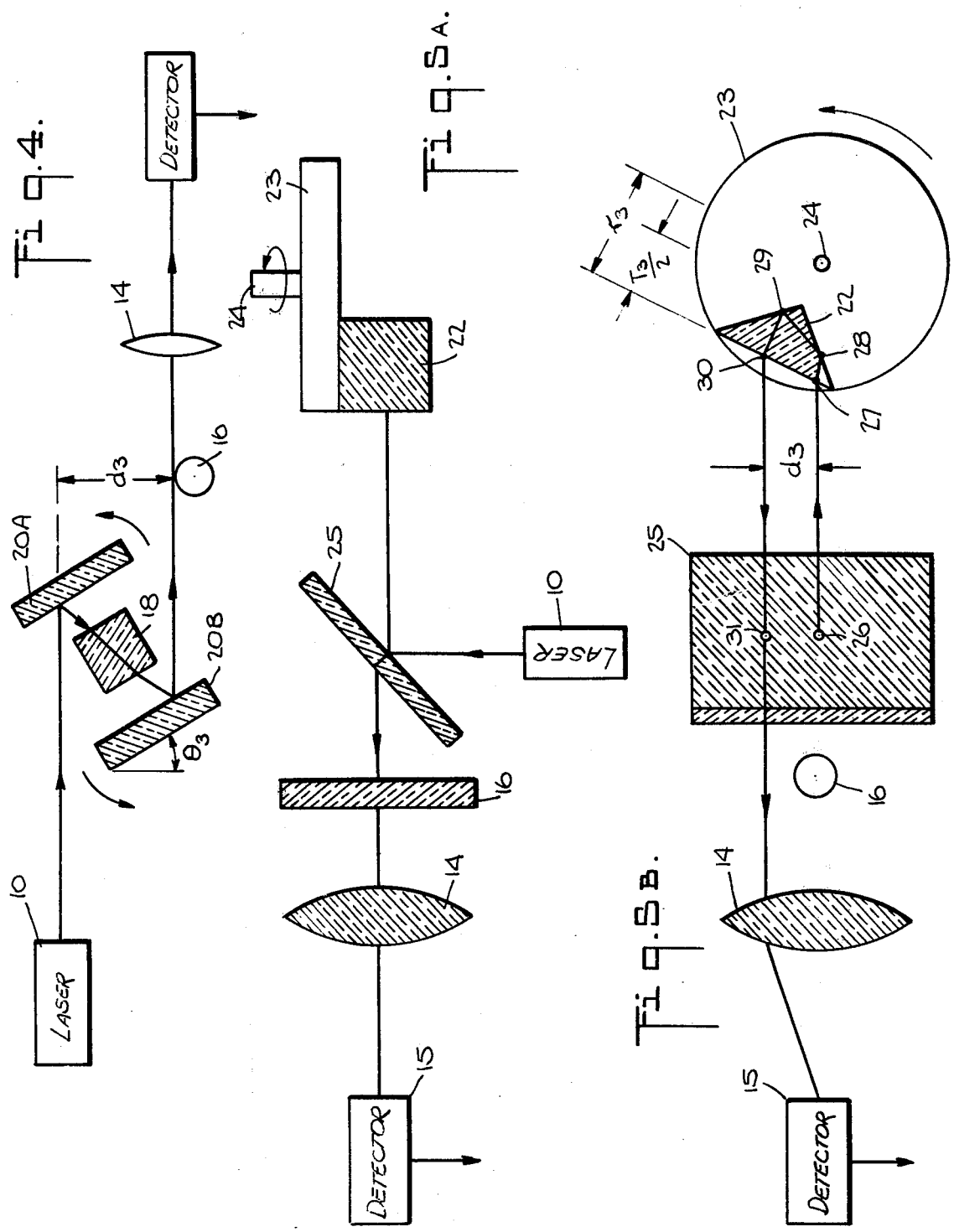

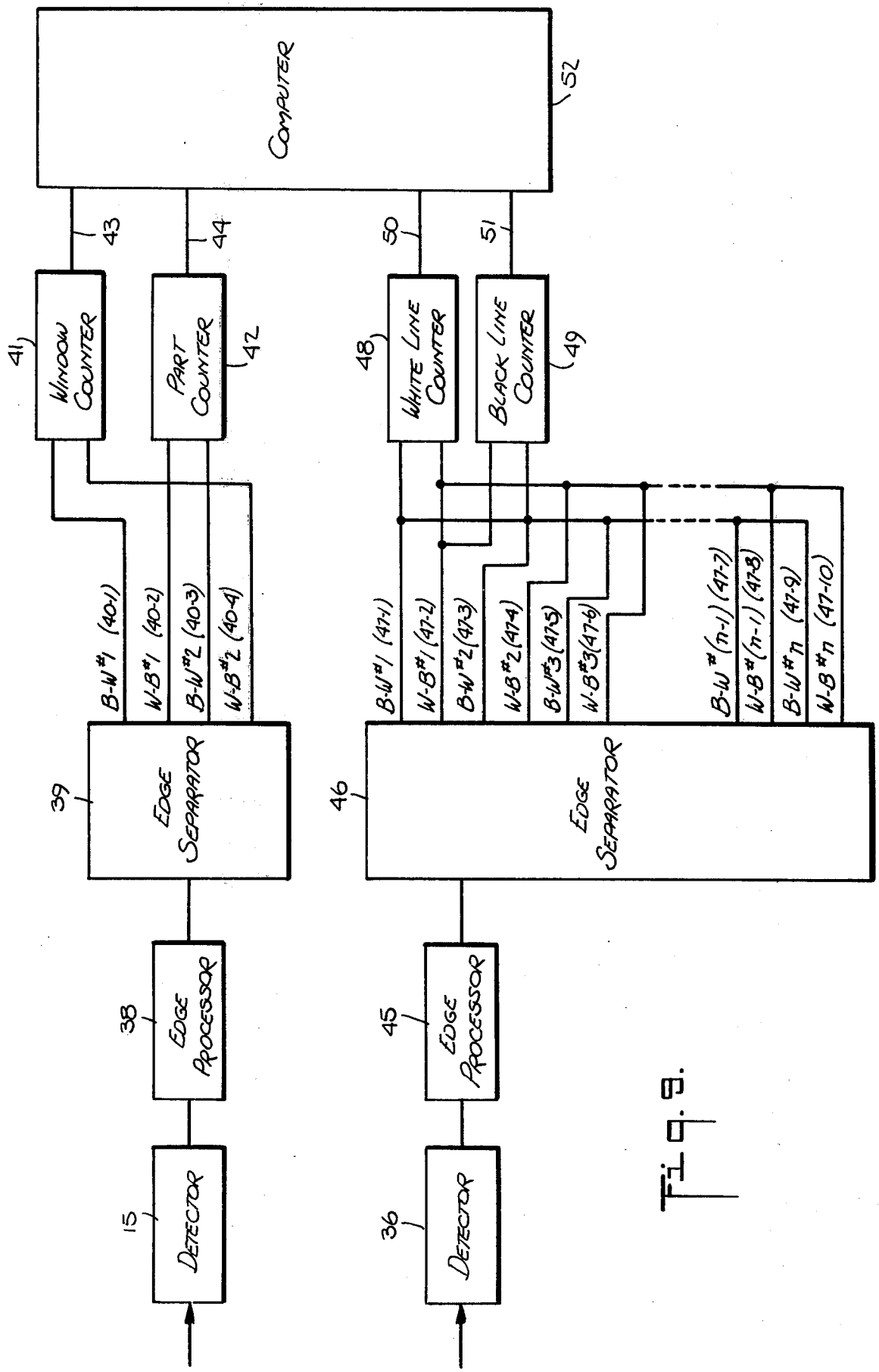

ELECTRO-OPTICAL MEASURING SYSTEM USING PRECISION LIGHT TRANSLATOR

BACKGROUND OF INVENTION

This invention relates generally to an electro-optical measuring system, and more particularly to a system which employs a laser beam to scan the object whose dimension is being measured to provide highly precise measurements.

Traditional gauging devices, such as micrometers and height gauges, all involve physical contact with the object being measured. The gauging procedure requires a trained operator and is often difficult and time-consuming. The widely used optical comparator technique in which a silhouette of the part is projected on a magnified scale onto a reference screen also dictates a trained operator and is subject to measurement errors due to eye fatigue, poor judgment and other factors. The rate of gauging by an optical comparator is limited by the ability of the operator to see and evaluate the image on the screen with respect to a reference outline.

In order to overcome the limitations of gauging procedures which entail human operators, non-contacting electronic measuring systems have been devised, many of which employ an electro-optical device such as a vidicon tube or an image dissector tube. These tubes, which include a photo-sensitive element, are adapted to electrically scan a light image or silhouette of the object projected onto the sensitive element to produce a video output that represents the dimension of the object being scanned.

One advantage gained by the use of an electronic scanning system is that the dimensions are obtained at a point remote from the part being gauged without the need for physical contact therewith. Also, measurements may be made to ascertain dimensions that are not readily accessible by physical contact.

One elementary form of electro-optical measuring system makes use of a light source which generates a fan-shaped light beam that is collected by a lens and focused on a photo-electric detector, the amount of energy falling on the detector being measured by standard photometric techniques. When the object to be measured is a cylinder of uniform diameter, such as a precision-ground shaft whose diameter is to be determined, the shaft is inserted in the fan-shaped light beam between the light source and the lens whereby the shaft intercepts a portion of the beam to an extent depending on its diameter. The approximate diameter of the shaft can then be determined by measuring the resultant reduction in energy picked up by the detector.

A more flexible electro-optical measuring system of greater precision is one using a light source producing a collimated beam to illuminate a field in which the shaft whose diameter to be measured is placed, the beam being projected toward a low distortion lens that develops a silhouette of the image generated by the shaft. This image is focused on the face of an electronic scanning tube or a standard T-V camera. An electro-optical arrangement of this type is disclosed in U.S. Pat. Nos. 3,854,822 and 3,902,811.

As explained in these patents, the scanner examines the images generated by the collimated light source and the imaging lens, and from this examination, it determines the dimensions of the shaft or other object being measured. It is to be understood that the shaft diameter is merely given as a very simple example of a dimension to be determined and that, in practice, the system disclosed herein may be used to measure any part dimension.

Other scanning systems have been constructed with rotating mirrors, prisms and gratings operating in conjunction with optical lenses and/or mirrors to produce a reasonably linear scan ranging from a few percent to 0.1% non-linearity.

SUMMARY OF INVENTION

In view of the foregoing, it is the main object of this invention to provide an electro-optical system which makes use of a scanning laser or light beam to effect measurement with an extremely high order of accuracy.

More particularly, it is an object of this invention to provide a system of the above type in which the scanning laser or light beam is translated in a direction parallel to itself to define a time-varying sensing field in which the object to be measured is inserted.

A significant feature of the invention resides in a composite optical scanner whose inherent scan non-linearities are effectively cancelled out to afford measurement of exceptional accuracy.

Also an object of the invention is to provide an extremely accurate electro-optical measuring system of relatively simple design which operates reliably and which can be manufactured at relatively low cost.

Briefly stated, these objects are accomplished in a system in which a laser beam or light beam is projected toward a composite scanner to produce a beam which is translated in a direction parallel to itself to define a time-varying collimated sensing field whose energy is picked up by a photo-electric detector yielding an output signal.

An object having a dimension to be measured is inserted in the field, whereby the output signal of the detector takes the form of a pulse whose pick-up width or time duration is an exact index to the distance between the boundaries of the dimension to be measured, the time duration being converted into a measurement reading.

The composite scanner is constituted by two or more individual scanner means whose individual non-linearities are of a character and magnitude that, by combining these means, the non-linearities are virtually cancelled out and a final scan is achieved that is extremely linear, whereby measurements of exceptional accuracy are obtained.

OUTLINE OF DRAWINGS

For a better understanding of the invention as well as other objects and further features thereof, reference is made to the following detailed description to be read in conjunction with the accompanying drawings, wherein:

FIG. 1 schematically illustrates an elementary form of a laser beam electro-optical measuring system to effect measurement;

FIG. 2 shows schematically a second and improved embodiment of the electro-optical measuring system in which a glass prism functions as the scanner means;

FIG. 3 illustrates schematically a third embodiment in which an air prism functions as the scanner means;

FIG. 4 shows schematically a fourth embodiment in which a composite scanner is constituted by a glass and air prism combination;

FIG. 5A illustrates schematically, in a top view, a fifth embodiment of the system in which the composite scanner is constituted by a single right-angle prism and a beam-splitting mirror;

FIG. 5B is a side view of the embodiment shown in FIG. 5A;

Figure 6:
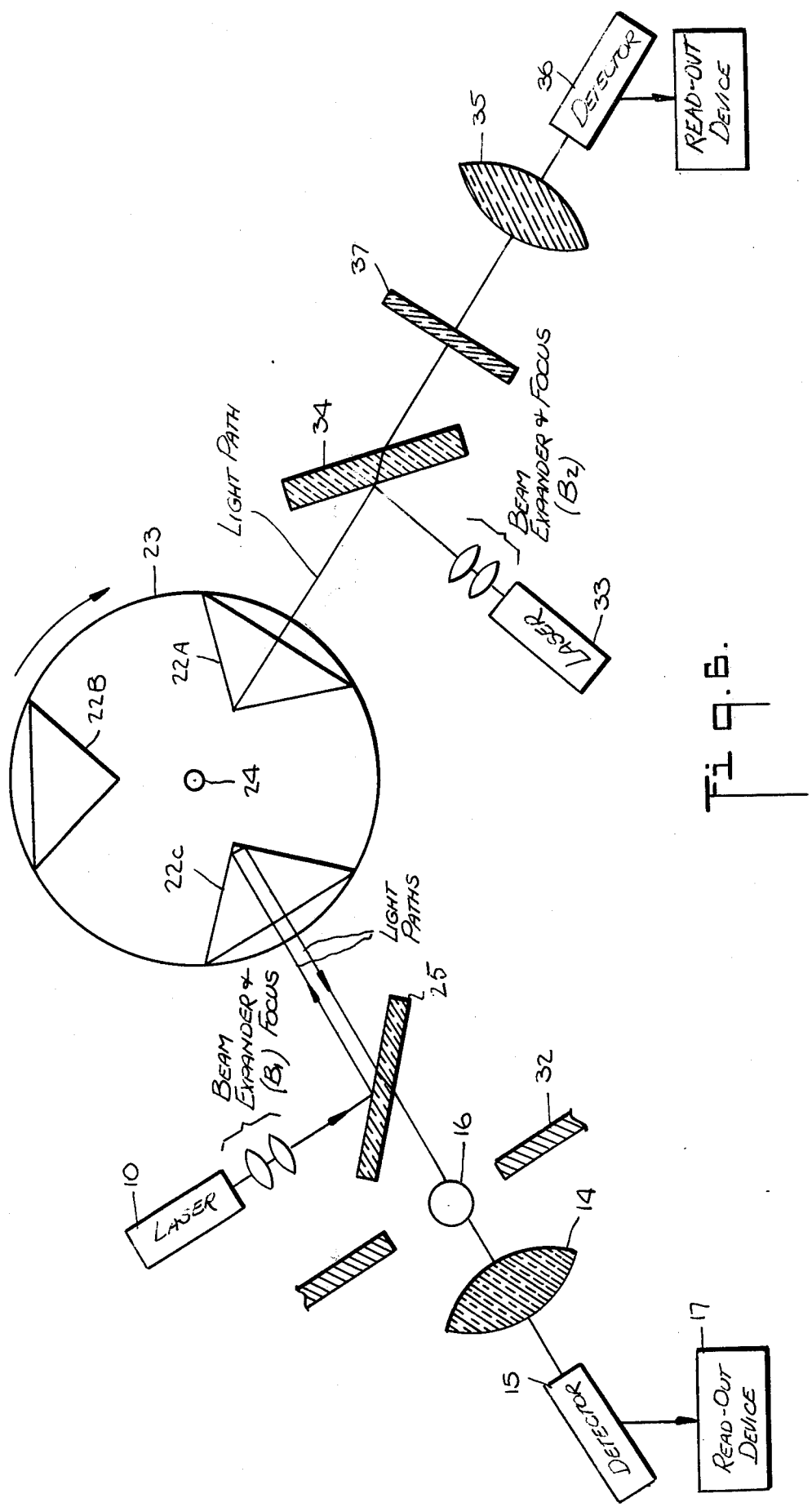
Figure 7:
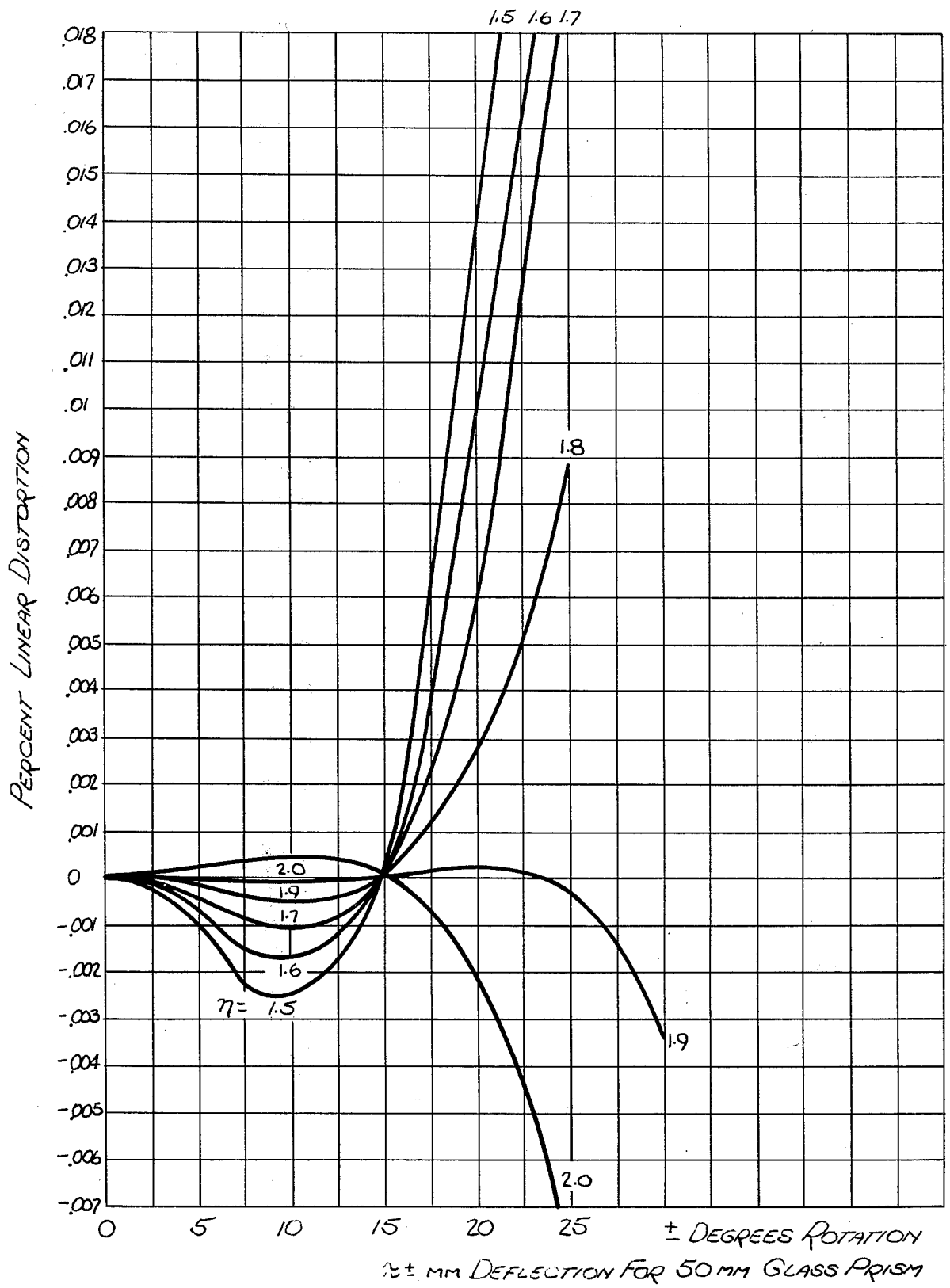
Figure 8:
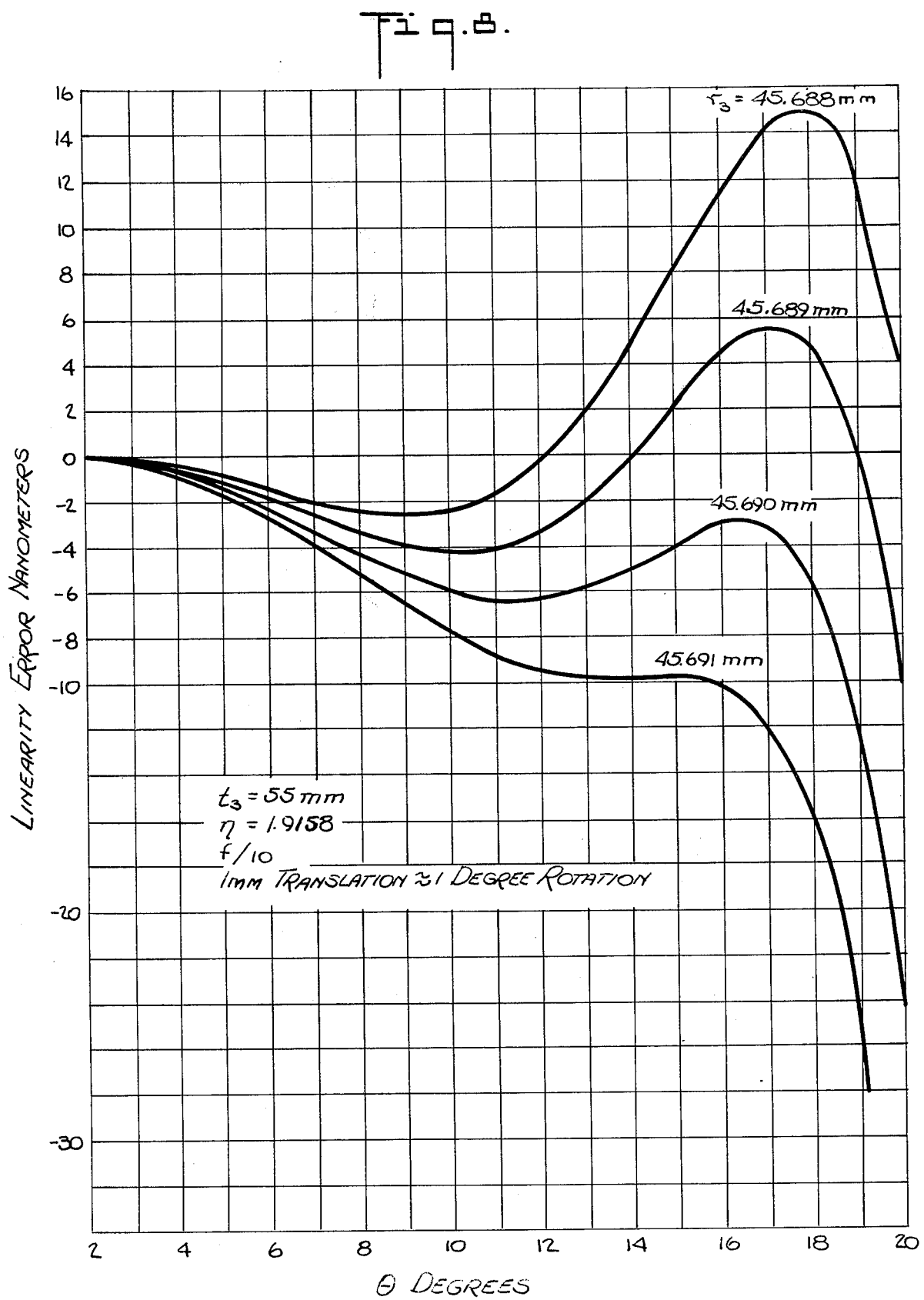

FIG. 6 schematically illustrates a sixth embodiment of a system using a composite scanner of the type shown in FIGS. 5A and 5B, but with a set of prisms;

FIG. 7 is a graph explanatory of the behavior of the system shown in FIG. 4;

FIG. 8 is a graph explanatory of the behavior of the system shown in FIGS. 5A, 5B, and FIG. 6; and FIG. 9 is a block diagram of the electronic arrangement for processing the signals produced by the detectors in the system shown in FIG. 6.

DESCRIPTION OF INVENTION

Basic Principles:

Underlying the present invention is the concept that one can carry out measurements of exceptional accuracy by translating a laser or light beam in a direction parallel to itself at a constant rate to define a time-varying sensing field whose energy is picked up by a suitably placed detector which yields an output signal. While at any one instant, there is only one laser or light beam line in the field, since the position of this line moves parallel to itself to traverse the field, the field may be said to be collimated.

By inserting an object in this scanning field, its dimension can be determined by measuring the elapsed time during which the translating beam moving at a constant rate is intercepted by the object and therefore does not reach the detector. Thus the output signal from the detector in the presence of an object in the field is a generally trapezoidal pulse whose leading edge is developed by the traversal of the beam across one boundary of the object being measured, thereby blocking passage of the energy to the detector, and whose trailing edge is developed by the traversal of the beam across the opposing boundary of the object to restore the energy pick-up the width or time duration of the pulse being an exact index to the distance between these boundaries. The time duration of the pulse is converted into a measurement reading.

The preferred embodiment of the invention makes use of a laser as a source for the beam which is translated parallel to itself. There are several reasons for this choice of a laser as the light source, the primary one being its monochromaticity, thus controlling the operating index of refraction of the prisms used in the suggested embodiments.

Before considering these reasons, it may be helpful to first review briefly a few of the basic distinctions between incoherent light produced by an ordinary source and the coherent light yielded by a laser.

The atoms of a solid or a gas in a conventional light source are thermally or electrically agitated to higher energy levels. When these atoms revert spontaneously to their lower energy levels, they radiate some of their excess energy as light. Because each atom behaves independently at this stage, its emission is random in time and duration, with a random polarization.

Hence the light radiated in a single direction is the complex sum of all the light from the individual atoms. The phases of any two atoms will tend to cancel their radiation in some directions and enhance it in others. On the average, the total energy of a conventional light source will be radiated uniformly in all accessible directions, and the amount of energy observed in a given direction will be proportional to the solid angle subtended by the observing device.

The maximum total energy that a given conventional light source can radiate depends not only on the surface area of the source but also, in the case of a solid source, on the maximum temperature to which the source can be heated without melting. In the case of a gaseous source such as a gas discharge lamp, it depends on the maximum pressure and temperature that can be sustained therein. Thus, in practice the only way to enlarge the power output from an ordinary source beyond the limitations imposed by the source material is to increase the source area.

In a laser source, light is also emitted when atoms drop from a higher energy level to a lower one; but in this instance the atoms are triggered to emit in unison by the standing wave in the laser cavity. Some of the light previously generated is retained in the reflective cavity to maintain the new emission in the proper phase, polarization and direction. This standing wave interacts with the excited atoms and causes most of them to emit their excess energy in phase with the stimulating wave before they have a chance to emit it randomly. The electromagnetic energy so generated is both coherent and monochromatic.

Furthermore, the laser generates only light that travels in the direction of the standing wave. In a typical laser, this directionality is limited only by the diffraction of the emerging beam by the laser aperture. The laser, therefore, does not violate the materials limitations of ordinary light sources; it simply concentrates all its energy into a single beam.

With a suitable lens, all the energy from a typical laser can be concentrated into a diffraction-limited image that gives rise to a tremendous energy density, one that is far greater than the energy density that can be obtained from a conventional incoherent light source. The crucial factor is that within the laser, the radiation is generated over a sizeable volume with the proper phase, so that when the radiation is focused by the lens, all the individual contributions lie in the correct additive phase.

The unique properties of the laser are exploited in the preferred embodiments in the following ways:

(1) The video signal generated by scanning the edge of an object with electromagnetic energy of any sort results in a signal whose amplitude is controlled by the diffraction and interference of the energy in the vicinity of the edge scanned. The position of the edge of the object in object space corresponds to the point on the profile of the video signal edge generated by this diffraction and interference convoluted with the finite width of the scanning beam. The F/number of the collection optics determines the amount of the diffracted energy accepted to form the video profile. For sharp edges, the position of the object boundary is at approximately 50% of the maximum video signal which would be obtained if the object plane were clear and empty. To establish this 50% point to any desired resolution and precision, the signal-to-noise ratio of the system must be greater than peak video signal divided by the change in video resulting from beam displacement of one resolution element.

In a well-designed optical scanning system, the limiting noise is due to the non-continuous nature of electromagnetic energy which is generated and detected as a series of discrete particles or photons. These photons tend to clump together, generating noise (called shot noise) whose magnitude is proportional to the square root of the total number of photons collected for any position of the scanning beam. Thus, the greater the resolution required, the more photons needed, the longer the dwell time required for the beam and the longer the measuring time required for a given light source. However, the high energy density achievable by a laser system provides a higher photon count per unit time than any other light source that can be used to generate a scanning beam. Because of this, the preferred embodiments of the invention can make a measurement to a resolution of a part in 10 million in 0.1 seconds, as discussed under Sixth Approach, "Time Requirements."

(2) The analysis for determining the exact shape of the video profile generated by scanning an edge is, to an extent, dependent on the wavelength of the electromagnetic energy used by the scanner. Control of this wavelength improves the accuracy of the analysis of the video profile shape. This, in turn, improves the accuracy of the determination of the position of the edge scanned. The most stable and most exact determination of wavelength of the light source is obtained by the user of a laser for this light source.

(3) In the preferred embodiments described below, a prism is used in the scanner optical path. For practical prism materials, the index of refraction $\eta$ varies with the wavelength of the light used. Therefore, to provide the required cancellation of nonlinearities and to control beam diameter at the object plane, a nearly monochromatic source is required. The laser ideally satisfies this requirement.

First Approach

FIG. 1 illustrates a laser beam measuring system which seeks to put into practice the above concept and which includes a laser 10 that may be any active device of the solid-state, gas or diode type that converts input power into a very narrow, intense beam of coherent energy.

The laser beam is projected toward a mirror 11 on an oscillating shaft 12 which causes the mirror to scan back and forth within a prescribed sector (i.e., 30 degrees). The beam reflected by the mirror is directed toward a collimating lens 13 which converts all elements of the swept beam to a beam that is translated in a direction parallel to itself to create a collimated field that extends between lens 13 and a collecting lens 14. Lens 14 receives all of the energy in this field and focuses it on a photoelectric detector 15. When an object to be measured is inserted in the collimated field, it blocks some of this energy. The remainder of the energy is focused on detector 15. The output signal yielded by the detector is applied to a suitable read-out circuit 17 which converts the signal to an analogous numerical value giving the dimensions of interest.

Because of the geometry of this optical arrangement, the laser beam which moves parallel to itself in the collimated field between the lenses does not move at a constant rate. The magnitude of the non-linearity is the difference between the angle rotated and its tangent. Hence if an object such as a shaft 16 is inserted in this field to produce an output signal in rectangular pulse form whose width reflects the time it takes for the beam to traverse the dimension of interest, because of the non-linearity in the rate of beam movement, the elapsed time is not linearly proportional to this dimension and the measurement reading derived from this interval will be inaccurate.

But if the equation of motion of the beam can be established, this equation may be used to "linearize" the measuring system. Thus by knowing the elapsed time and the linearization equation, one can arrive at a correct measurement of the dimension of interest. In practice, however, this linearization procedure cannot be carried out to much better than a part in one thousand; hence this approach is not acceptable for highly accurate measurement.

Second Approach

In an attempt to generate a translating laser beam which moves in a direction parallel to itself at a rate which approaches a constant rate to a far greater degree than is attainable by the system illustrated in FIG. 1, one may use the set-up illustrated in FIG. 2.

In this arrangement, the beam from laser 10 is projected toward a glass prism 18 having an index of refraction represented by symbol "$\eta$." Prism 18, which is mounted on a rotating shaft 19 driven by a suitable motor is four-sided with opposite sides parallel. The laser beam enters one side of the prism and is refracted thereby. A similar refraction of opposite sign is experienced by the beam leaving the prism. As the prism rotates, the beam is translated in a direction parallel to itself to produce a collimated field, the energy of which is collected by lens 14 and focused onto detector 15. The relationship between the displacement $d_1$ of the beam in the collimated field and the rotational angle $\theta_1$ is expressed by the equation:

$$d_1 = t_1 \left( \sin \theta_1 - \frac{\sin 2\theta}{2\sqrt{\eta^2 - \sin^2 \theta_1}} \right)$$

For thirty degrees of rotation, the beam displacement $d_1$ as a function of the rotation $\theta_1$ of the prism, will, for a prism having an index of refraction of 1.5, depart from linearity by 2.6%. This non-linearity will, of course, degrade the accuracy of measurement for the reasons given in connection with FIG. 1. However, the non-linearity can be reduced to 1.6% with a prism having an index of refraction of 1.9. With more exotic prism material having an even higher index of refraction, further improvements in linearity may be effected.

Third Approach

In the arrangement shown in FIG. 3, the approach is somewhat similar to that taken in the FIG. 2 system; but in this instance, use is made of a so-called "air prism" constituted by a pair of mirrors 20A and 20B held in parallel relation and supported to rotate about a common center 21. The beam from laser 10 is projected toward mirror 20A and reflected thereby toward mirror 20B, mirror 20B directing the beam toward collecting lens 14 which focuses the energy onto detector 15. This results in a beam displacement $d_2$ for an air prism rotational angle $\theta_2$ in accordance with the following equation:

$$d_2 = 2t_2 \sin \theta_2$$

For thirty degrees of rotation, the scan non-linearity will be about 1.1%, which is somewhat better than is attainable with the second approach but still not nearly sufficient for an exceptionally high order of accuracy.

Fourth Approach

It is to be noted that with a glass prism and an air prism scanning technique, the respective displacements are of opposite signs for a given rotation. Moreover, the non-linearities are also of opposite sign. If, therefore, the glass prism shown in FIG. 2 and the air prism in FIG. 3 are combined in the configuration shown in FIG. 4, the beam from laser 10 will be deflected by both prisms before entering the collimated region or measurement field in which the object to be measured is inserted.

This technique by which the non-linearities of opposite sign are added in order to cancel them out gives rise to a scan in which the displacement of the beam as a function of the rotational angle, is linear to better than 0.003%, even with prism material having a low (i.e., an $\eta$ of about 1.5) index of refraction. And with higher indices of refraction, the scan non-linearities can be maintained below 0.0001% over 40 degrees of rotation.

The improvement gained by the fourth approach, which makes use of a combined or composite scanning means, is illustrated in FIG. 7, which is a graph of the performance of this configuration. In this figure, the degrees of rotation is plotted against the percentage of distortion in linearity for indices of refraction $\eta$ for the respective values 1.5, 1.6, 1.7, 1.8, 1.9 and 2.0, based on a 25° half-angle rotation generating approximately 25 mm displacement in object space, for a prism with a 50 mm base.

Thus a 0.001 percent distortion corresponds to a non-linearity in object space of 0.25 microns. As is evident from these plots, an index of refraction slightly in excess of 1.9 (actually a value of almost precisely 1.916) affords an output that is extremely linear over a half angle of rotation of at least 24°.

But it is quite difficult, as a practical matter, to find a material with an index of refraction having precisely the value necessary to introduce the desired correction in linearity. A workable solution to this problem is to combine two materials to form the rotating prism. This can be done by using two slabs to generate the prism, each slab having a different index of refraction. A two-slab prism would then be "tuned" to provide the final overall index of refraction for optimum linearity. It will be seen, for example, by examining FIG. 7, that almost equal widths of a material having a refraction index of 1.8 and 2.0 would afford a very small non-linearity out to at least 25 degrees half-angle rotation.

However, to implement this approach in a practical scanner is quite difficult to accomplish. This is especially true of the problem of getting the light past the mirrors without sacrificing a portion of the scan field of view or introducing a conical scan effect.

Fifth Approach

Recognizing the advantages to be gained by combining two scan techniques which exhibit non-linearities of opposite sign, the problem then is to devise a simple, easily-implemented scanning means for which the equation defining beam displacement versus angular rotation consists of two terms, each having a nonlinearity of approximately the same magnitude but of opposite sign.

Such a scanner configuration is shown in FIGS. 5A and 5B. The scanner itself is the right angle roof prism 22 mounted eccentrically on a rotating disc 23, as shown. The distance from the face of the roof prism to the center of shaft 24 around which disc 23 rotates is $r_3$. Thus the distance between the roof of the prism and the center of rotation of shaft 24 is $r_3 - (t_3/2)$.

In the electro-optical system shown in FIGS. 5A and 5B, the beam is projected by laser 10 toward a beam splitter 25 meeting the beam splitter at a typical point 26. From point 26 the beam is directed toward roof prism 22 which it enters, typically at point 27, the beam then being reflected successively from the two surfaces of the roof prism, typically at points 28 and 29 thereon, to exit at a typical point 30. From point 30, the beam proceeds through beam splitter 25, typically at point 31, to form a measurement field in which the laser beam is translated parallel to itself. The energy of this field is collected by lens 14 and focuses thereby onto detector 15.

In the measurement field established between beam splitter 25 and collecting lens 14, the position of the beam is defined by the following equation:

$$d_3 = 2r_3 \sin \theta_3 - \frac{t_3 \sin 2\theta_3}{\sqrt{\eta^2 - \sin^2 \theta_3}}.$$

wherein $\eta$ is the index of refraction.

In this equation, the two terms each have a non-linearity of approximately the same magnitude and general shape, and the equation is therefore of the desired form. Moreover, as can be seen, each of the terms can be varied separately. Thus $r_3$ appears in the first term but not in the second; and $t_3$ and $\eta$ appear in the second term but not in the first. Thus by appropriate manipulation of the $r_3$, $t_3$ and $\eta$ factors, the linearity of the entire scanner can be optimized.

FIG. 8 is a graph in which displacement is plotted against angular rotation for a typical prism based on this design, with a $t_3$ factor of 55 mm and an $\eta$ factor of 1.9158. The running variable $r_3$ is plotted for the respective values 45.688, 45.689, 45.690 and 45.691 mm.

The plot shows the linearity error in nanometers ($10^{-9}$ meter) versus rotation ($\theta$ degrees; scale 2 to 20). Only half of the rotation is plotted, for the plot is symmetrical about the $\theta = 0$ degree axis. As will be evident from this graph, a value of $t_3$ equals 45.689 mm results in a non-linearity of less than five nanometers over an excursion of plus or minus 16° for a total rotation of 32° and less than 6 nanometers for a rotation of ±19.7°. The percent non-linearity is better than 1 part in 6 million for the configuration plotted. Techniques for increasing this linearity are discussed under "Refinements" below.

Sixth Approach

Referring now to FIG. 6, there is shown a preferred arrangement of the eccentrically-mounted roof prism approach illustrated in FIGS. 5A and 5B for developing a linear scan. Instead of a single roof prism mounted eccentrically on rotating disc 23, a set of three prisms 22A, 22B and 22C are mounted on the roofs thereof at a carefully controlled spacing from the center of rotation of the disc. Thus for each rotation of the disc, one carries out three scans of the measurement field. In practice, one may mount as many as six such prisms on the same disc.

In a practical metrology system of this type, the linearity of the laser beam scan is predicated on maintaining the rate of rotation of disc 23 on which the roof prism is mounted virtually constant. Since it may prove, as a practical matter, to be difficult to maintain the rate of disc rotation constant to an acceptable degree, one may predicate linearity, not on a virtually constant rate, but on knowing the actual speed of rotation during the measurement cycle and taking this into account in the measurement.

This alternative approach, in which the actual speed of rotation is determined during the measurement cycle, is carried out in FIG. 6, by means including a window 32 having finished edges, the window opening lying in the plane of object 16 whereby the scanning beam is picked up by detector 15 only within the confines of the window opening and is intercepted by the object therein.

The dimensions of this window and its edge preparation are such that at the time at which the laser beam traverses each of the window edges can be determined to within one part in twenty million of the time required for the beam to traverse the distance between the edges. Thus by determining the time it takes to traverse the distance between the edges of window 32, the average velocity of the beam in the object space while scanning the window opening can be determined to an accuracy of one part in twenty million.

By this procedure one can, of course, only ascertain the average velocity of the beam traversing the sensed field. By use of properly designed bearings for rotating disc 23 plus a sufficiently high, well-balanced moment of inertia therefor, one can be reasonably sure that the instantaneous velocity of the disc does not deviate from the average velocity thereof sufficiently to effect the measurement as the beam scans through the object region defined by the opening in window 32.

However, to be certain that this is true and, if not, to effect the necessary corrections for velocity variations in the calculated dimension of the object (shaft 16), an auxiliary optical path is provided in the preferred embodiment of the system in accordance with the invention illustrated in FIG. 6.

This auxiliary optical path is constituted by the right-angle roof prisms 22A, 22B, 22C mounted on rotating disc 23 in combination with a laser 33, a beam splitter 34, a collecting lens 35 and a photo detector 36. This auxiliary path corresponds to the main optical path formed by laser 10, beam splitter 25, collecting lens 14 and detector 15.

In this auxiliary optical path, there is produced a collimated field in which is interposed a ruled grating 37. As the translating beam generated by the operative prism traverses the ruled grating, a measuring device coupled to the output of detector 36 determines the time it takes for the beam to cross from one precisely known point on the grating surface to the next point thereon to determine the instantaneous velocity throughout the measuring cycle. This set of measurements can be used to determine the constancy of the velocity maintained by rotating disc 23.

Beam expander and focusing lenses B$_1$ and B$_2$ are associated with lasers 10 and 33, respectively.

If the velocity is sufficiently constant, no correction is called for; but if variations are sensed that would adversely affect the metrology, these variations can be used to correct the reading of the shaft diameter obtained from the read-out device 17 associated with detector 15.

Time Requirements

The scanning system illustrated in FIG. 6 with proper refinements is capable of maintaining a linearity of approximately 0.2 micro-inches over a measuring distance of almost two inches; that is to say, 5 nanometers over a distance of about 5 mm, this representing a part in 10 million.

In order to insure that this exceptionally higher order of linearity is not compromised by time quantizing, it is essential to have a minimum time resolution of one part in 20 million during the traverse of the measurment beam across the object space.

Commercially-available circuitry reflecting the present state of the art is capable of operating reliably at rates of 200 million pulses per second. At this rate, the system takes 0.1 seconds to generate the required 20 million pulses when scanning a distance of 2 inches in object space to make a measurement.

This results in a rate of disc rotation of approximately 60° in 0.1 seconds, or one full revolution in 0.6 seconds. During this 0.6 seconds period, the number of measurements that can be carried out is a function of the number of roof prisms mounted on the rotating disc. While three such discs are shown in FIG. 6, a greater number is possible, as previously noted.

The rate of one measurement in 0.1 seconds is limited only by the present commercial availability of reliable high speed counting circuits and associated clock circuits. Hence as high counting speeds become commercially available, the rate of measurement can be increased proportionately with appropriate changes in other system parameters as required.

To show that the resolution of 0.2$\mu$" can be obtained, it is necessary to show that the photon count achieved during each 0.2$\mu$" dwell time of $10^{-8}$ sec. will provide an adequate signal-to-noise ratio.

The system shown in FIG. 6 will generate a beam diameter at the object plane of approximately 1000$\mu$". To resolve edge position to the required 0.2$\mu$" requires:

$$\frac{\text{Peak Signal}}{\text{Peak to Peak noise}} \leq \frac{1000\mu''}{0.2\mu''} = 5000$$

To achieve this signal to noise (S/N), the system must, during each decision-making time period of $10^{-8}$ sec., insure that the photons collected $\geq 5(S/N)^2 = 5(5000)^2 = 1.25 \times 10^8$. This then requires that the effective photon rate at the detector be:

$$1.25 \times 10^8 \text{ photons/decision} \times \frac{1}{10^{-8} \text{ sec}} = 1.25 \times 10^{16} \text{ photons/sec.}$$

This requires an effective power of 3.8 milliwatts at the detector for a HeNe laser operating at 632.8 nanometers or 5.4 milliwatts at the detector for a He-Cadmium laser operating at 441.6 nanometers. Either of these levels of effective power (including the quantum efficiency of the detector) is readily achievable with reliable, commercially-available, relatively inexpensive lasers.

Refinements and Further Applications

The electro-optical scanning laser or light beam measuring systems disclosed herein are adapted to develop a linear scan by a composite scanner constituted by two or more beam scanner means whose individual non-linearities have a character and magnitude such that their combination gives rise to an extremely linear scan.

A practical composite scanner in accordance with the arrangement illustrated in FIGS. 5 and 6 can be configured to afford a scan linearity of a part in 10 million covering a measurement distance of about 50 mm. This degree of linearity is attainable with existing technology for generating flat prism and beam splitter surfaces. The flatness of the three surfaces of the roof prism directly affects the linearity of the scan, and a part in 10 million represents the best presently available state of the art for producing such flat surfaces. Obviously, as advances are made in the technology for generating flat surfaces, the linearity of the scan can be further improved.

One can also improve the linearity of the system shown in FIGS. 5 and 6 by controlling the f/number of the beam projected by laser 10 toward the roof prism. The convergence of this beam introduces an additional source of non-linearity which can be controlled by varying the f/number to further reduce the non-linearity of the overall system.

An improvement in linearity can also be effected by a slab construction in the fabrication of the roof prism. Using a slab mounted over the front face of the prism, with or without an air gap therebetween, introduces an additional non-linearity which can be trimmed by varying the index of refraction of the added slab and its thickness. Also, the air gap, if one exists, can be varied to modify the optical characteristics of the prism. So mounted and trimmed, the non-linearity introduced by the slab can be used to cancel out some of the residual non-linearities in the rest of the system.

The glass slab itself introduces a coma-like abberration for focused beams as a result of rotation angle and f/no. This effect, along with the f/no., affords additional control of linearity, the combined balanced effects resulting in a linearity of better than 1 part in 10 million.

While the invention has been described as a system for gauging parts, the system may also be adapted to provide a linear laser beam scan for reading information from photographs for further processing, particularly digital type processing. The problem of processing photographic information exists in reconnaissance, spy-in-the-sky and satellite photographs where digital processing of the raw photographic data is always required.

Moreover, the system is applicable to high precision monitoring of a rotating shaft to effect velocity or position control thereof. The measurement of the angular movement of a goniometer with techniques of the type heretofore known, is limited from one to five parts per million. However, by converting shaft rotation to the translation of a spot in object space in a system in accordance with the invention and tracking this spot by means of a ruled grating, the shaft position can be determined to a part in ten million over the range of the system; namely, ±16 degrees or better.

Signal Processing

We shall now, in connection with the embodiment shown in FIG. 6, indicate in greater detail how the video signals from detectors 15 and 16 are preferably processed. The video outputs from detectors 15 and 36 are applied to edge processors 38 and 45 to determine the time at which the video levels corresponds to the edge positions in object space. The resulting signals, in the form of standard logic levels for which the transition times correspond precisely to the time of the measuring beam crossing the edge positions of interest in object space, are then fed into edge separators 39 and 46.

Edge separator 39 generates four pulses for each measuring beam through the area collected by lens 14. Two of these four pulses indicate the time of traversing the region defined by window 32; there are black to white transition #1 (B-W #1, 40-1) and W-B #2 (40-4). B-W #1 (40-1) is used to initiate counting of window counter 41. W-B #2 (40-4) is used to stop the counting of window counter 41.

Similarly, W-B #1 (40-2) indicates the time corresponding to the first boundary of the part being measured. It is used to initiate counting of part counter 42. B-W #2 (40-3) indicates the time corresponding to the opposite boundary of the part being measured. It is used to stop counting of part counter 42.

Thus at the end of one measuring cycle, corresponding to traversing the measuring beam from one side of window 32 to the other, counters 41 and 42 contain numbers representing the number of clock pulse time periods for the measuring beam to traverse the window 32 and the part being measured 16. These numbers are fed to computer 52 where the ratio is used to determine the dimensions of part 16.

In a similar processing fashion, edge separator 46 generates a series of output pulses corresponding to the transition times generated by the measuring beam traversing ruled grating 37. These pulses are directed to start and stop white line counter 48 and black line counter 49 in a manner such that the time (expressed in system clock pulses) required for the measuring beam to traverse each individual line of ruled grating 37 is determined by the counters. The individual times for traversing each line of grating 37 are fed into computer 52. These times are used to monitor, and, if necessary, correct part measurement computation for any velocity variations during the measurement time cycle.

In addition to the blocks shown in FIG. 9, the processing circuitry will also require a stable clock generating the pulses to be counted by counters 41, 42, 48 and 49, plus normal supervisory command and reporting paths and methods of implementing them to perform such functions as resetting counters, reporting measured dimensions, etc.

While there have been shown and described preferred embodiments of electro-optical measuring system using precision light translator in accordance with the invention, it will be appreciated that many changes and modifications may be made therein without, however, departing from the essential spirit thereof.

We claim:
1. An electro-optical measuring system comprising:
    (A) a source projecting a light beam;
    (B) a scanner which receives the projected beam and causes said beam to undergo translation in a direction parallel to itself at a constant rate to define a time-varying sensing field, said scanner being a composite of at least two scanner means whose individual non-linearities are of such character and magnitude that in combination these non-linearities are effectively cancelled out to produce a final scan that is extremely linear;
    (C) means including a detector to collect and pick up the energy of said field to produce an output signal which, when an object is inserted in the field, has a pulse form whose leading edge coincides with the instant the beam in the field strikes one boundary of the object, thereby interrupting the pick-up, and whose trailing edge coincides with the instant the beam departs from the opposite boundary of the object to restore the pick-up, whereby the width or time duration of the signal pulse is an index to the distance between the boundaries and hence the dimension of interest.

2. A system as set forth in claim 1, wherein said source is a laser producing coherent light.

3. A system as set forth in claim 1, further including a read-out device to convert the signal into a value indicative of the dimension.

4. A system as set forth in claim 1, wherein said detector means includes a collecting lens to collect the energy of said field and to focus it on said detector.

5. A measuring system as set forth in claim 1, wherein said composite is formed by two prisms having non-linear characteristics of opposite sign.

6. An electro-optical measuring system comprising:
(A) a source projecting a light beam;
(B) a scanner associated with a detector, said scanner receiving the projected beam and causing said beam to undergo translation in a direction parallel to itself at a constant rate to define a time-varying sensing field constituted by a right-angle prism eccentrically mounted on a rotating disc and a beam splitter at a fixed position relative to said beam in an arrangement in which the beam is projected onto said beam splitter and directed thereby toward said moving prism which redirects said beam through said beam splitter to establish said field between said beam splitter and said detector means; and
(C) means including said detector to collect and pick up the energy of said field to produce an output signal which, when an object is inserted in the field, has a pulse form whose leading edge coincides with the instant the beam in the field strikes one boundary of the object, thereby interrupting the pick-up, and whose trailing edge coincides with the instant the beam departs from the opposite boundary of the object to restore the pick-up, whereby the width or time duration of the signal pulse is an index to the distance between the boundaries and hence the dimension of interest.

7. A system as set forth in claim 6, including a set of two or more prisms eccentrically mounted on said rotating disc whereby said prisms are successively operative with respect to said beam.

8. A system as set forth in claim 7, further including means to determine the velocity at which said disc rotates to effect a correction in the measurement in the event the velocity thereof is not constant.

9. A system as set forth in claim 8, in which said velocity-determining means is constituted by an auxiliary optical path which corresponds to the optical path that includes said mirror and said detector means and is provided with corresponding components to produce an auxiliary collimated field, and a ruled grating interposed in said auxiliary field to produce an auxiliary signal each time the auxiliary beam intercepts a line thereof.

10. A system as set forth in claim 6, further including a window in the field within whose opening is positioned the object being measured to limit pick-up by said detector to the space within said opening.

11. A system as set forth in claim 10, wherein the edges of said window are finished to define extremely sharp boundaries.

* * * * *